US011479022B2

(12) United States Patent
Gubbels et al.

(10) Patent No.: US 11,479,022 B2
(45) Date of Patent: *Oct. 25, 2022

(54) LAMINATION PROCESS

(71) Applicant: DOW SILICONES CORPORATION, Midland, MI (US)

(72) Inventors: Frederic Gubbels, Seneffe (BE); Victor Baily, Seneffe (BE); Gregory Chambard, Seneffe (BE); Guy Beaucarne, Seneffe (BE)

(73) Assignee: DOW SILICONES CORPORATION, Midland, MI (US)

( * ) Notice: Subject to any disclaimer, the term of this patent is extended or adjusted under 35 U.S.C. 154(b) by 56 days.

This patent is subject to a terminal disclaimer.

(21) Appl. No.: 16/611,553

(22) PCT Filed: Feb. 7, 2018

(86) PCT No.: PCT/US2018/017185
§ 371 (c)(1),
(2) Date: Nov. 7, 2019

(87) PCT Pub. No.: WO2018/208348
PCT Pub. Date: Nov. 15, 2018

(65) Prior Publication Data
US 2020/0398537 A1   Dec. 24, 2020

(30) Foreign Application Priority Data
May 9, 2017  (GB) .................................... 1707439

(51) Int. Cl.
B32B 17/10   (2006.01)
B32B 37/10   (2006.01)

(52) U.S. Cl.
CPC .. *B32B 17/10302* (2013.01); *B32B 17/10798* (2013.01); *B32B 17/10908* (2013.01);
(Continued)

(58) Field of Classification Search
CPC ........ B32B 17/10302; B32B 17/10798; B32B 17/10908; B32B 37/1009
(Continued)

(56) References Cited

U.S. PATENT DOCUMENTS 3,030,371 A   4/1962  Walter
3,334,067 A   8/1967  Weyenberg
(Continued)

FOREIGN PATENT DOCUMENTS

CN   1365379 A   8/2002
CN   105440693 A   3/2016
(Continued)

OTHER PUBLICATIONS

International Search Report for PCT/US2018/017185 dated May 11, 2018, 4 pages.
(Continued)

*Primary Examiner* — Tahseen Khan
(74) *Attorney, Agent, or Firm* — Warner Norcross + Judd LLP

(57) ABSTRACT

A lamination process is disclosed. The process is useful for silicone based lamination adhesive compositions, in particular those which cure at or around room temperature.

19 Claims, 2 Drawing Sheets

Figure 1A:
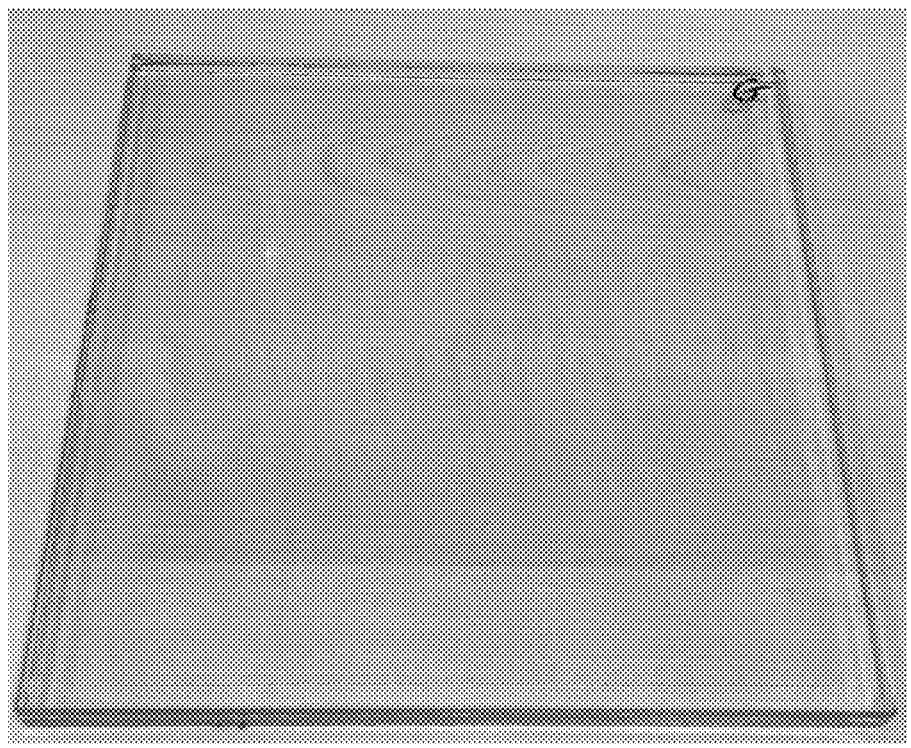

(52) U.S. Cl.
  CPC ...... *B32B 37/1009* (2013.01); *B32B 37/1045* (2013.01); *B32B 2309/04* (2013.01); *B32B 2309/12* (2013.01); *B32B 2451/00* (2013.01); *B32B 2457/12* (2013.01); *B32B 2457/20* (2013.01)

(58) Field of Classification Search
  USPC .......................................................... 428/38
  See application file for complete search history.

(56) References Cited

U.S. PATENT DOCUMENTS

| | | | |
|---|---|---|---|
| 3,419,516 A | 12/1968 | Tarao | |
| 4,087,585 A | 5/1978 | Schulz | |
| 4,754,013 A | 6/1988 | Antonen | |
| 4,908,140 A | 3/1990 | Bausch et al. | |
| 5,089,253 A | 2/1992 | Halloran | |
| 5,126,389 A | 6/1992 | Ona et al. | |
| 5,194,649 A | 3/1993 | Okawa | |
| 5,232,611 A | 8/1993 | Ohashi et al. | |
| 5,262,088 A * | 11/1993 | Hill | C08J 3/26 516/123 |
| 5,281,455 A | 1/1994 | Braun et al. | |
| 5,300,171 A | 4/1994 | Braun et al. | |
| 5,380,464 A | 1/1995 | McGee et al. | |
| 5,684,110 A | 11/1997 | Kawamura | |
| 5,804,631 A * | 9/1998 | Mine | C09J 183/04 524/440 |
| 5,840,794 A | 11/1998 | Palmer | |
| 6,015,784 A | 1/2000 | Kazuta et al. | |
| 6,169,142 B1 | 1/2001 | Nakano et al. | |
| 6,521,587 B1 | 2/2003 | L'Hostis et al. | |
| 6,534,581 B1 | 3/2003 | Kleyer et al. | |
| 6,593,413 B2 | 7/2003 | Muramatsu et al. | |
| 6,642,309 B2 | 11/2003 | Komitsu et al. | |
| 7,144,953 B2 | 12/2006 | Ueda et al. | |
| 7,417,105 B2 | 8/2008 | Landon et al. | |
| 7,893,170 B2 | 2/2011 | Wakioka et al. | |
| 7,951,458 B2 | 5/2011 | Ogura et al. | |
| 7,973,108 B2 | 7/2011 | Okamoto et al. | |
| 8,030,371 B2 | 10/2011 | Chaussade | |
| 8,231,944 B1 | 7/2012 | Schroeder | |
| 8,536,109 B2 | 9/2013 | Delbrassinne et al. | |
| 8,609,797 B2 | 12/2013 | Knepper et al. | |
| 8,686,094 B2 | 4/2014 | Djurdjevic et al. | |
| 8,785,537 B2 | 7/2014 | Carrard et al. | |
| 8,801,890 B2 | 8/2014 | Verosky et al. | |
| 9,051,435 B2 | 6/2015 | Takei et al. | |
| 9,228,061 B2 | 1/2016 | Brandstadt et al. | |
| 9,493,689 B2 | 11/2016 | Stanjek et al. | |
| 9,527,985 B2 | 12/2016 | Okamatsu | |
| 9,732,203 B2 | 8/2017 | Okamatsu | |
| 10,150,888 B2 | 12/2018 | Simon et al. | |
| 10,414,907 B2 | 9/2019 | Takahara | |
| 10,563,015 B2 | 2/2020 | Gubbels et al. | |
| 2002/0010251 A1 | 1/2002 | Muramatsu et al. | |
| 2002/0193273 A1 | 12/2002 | Richards, III et al. | |
| 2003/0119917 A1 | 6/2003 | Fey et al. | |
| 2004/0002571 A1 | 1/2004 | Sakamoto et al. | |
| 2006/0122295 A1 | 6/2006 | Oysaed et al. | |
| 2006/0194067 A1 | 8/2006 | Beger et al. | |
| 2006/0258818 A1 | 11/2006 | Kimura et al. | |
| 2007/0173597 A1 | 7/2007 | Williams et al. | |
| 2007/0219299 A1 | 9/2007 | Okamoto et al. | |
| 2007/0237912 A1 | 10/2007 | Correia | |
| 2007/0244249 A1 | 10/2007 | Correia | |
| 2007/0282047 A1 | 12/2007 | Kimura et al. | |
| 2007/0287780 A1 | 12/2007 | Wakabayashi et al. | |
| 2008/0033087 A1 | 2/2008 | Okamoto et al. | |
| 2008/0076878 A1 | 3/2008 | Wakioka et al. | |
| 2008/0172807 A1 | 7/2008 | Brun | |
| 2008/0179616 A1 | 7/2008 | Lee et al. | |
| 2008/0194773 A1 | 8/2008 | Wakioka et al. | |
| 2008/0279901 A1 | 11/2008 | Prigent et al. | |
| 2008/0284106 A1 | 11/2008 | Maton et al. | |
| 2008/0287636 A1 | 11/2008 | Wakabayashi et al. | |
| 2008/0292572 A1 | 11/2008 | Benabdillah | |
| 2008/0312365 A1 | 12/2008 | Maton et al. | |
| 2008/0312366 A1 | 12/2008 | Maton et al. | |
| 2008/0312367 A1 | 12/2008 | Maton et al. | |
| 2008/0319152 A1 | 12/2008 | Okamoto et al. | |
| 2009/0029043 A1 | 1/2009 | Rong et al. | |
| 2009/0215944 A1 | 8/2009 | Maton et al. | |
| 2009/0234052 A1 | 9/2009 | Maton et al. | |
| 2010/0093598 A1 | 4/2010 | Davio et al. | |
| 2010/0137454 A1 | 6/2010 | Barmes et al. | |
| 2010/0144585 A1 | 6/2010 | Aksoy et al. | |
| 2010/0184883 A1 | 7/2010 | Detemmerman et al. | |
| 2010/0275992 A1 | 11/2010 | Watanabe | |
| 2011/0003081 A1 | 1/2011 | Maton et al. | |
| 2011/0028646 A1 | 2/2011 | Sixt et al. | |
| 2011/0144246 A1 | 6/2011 | Dabbous et al. | |
| 2011/0165206 A1 | 7/2011 | Liu et al. | |
| 2011/0248314 A1 | 10/2011 | Takei et al. | |
| 2012/0016063 A1 * | 1/2012 | Maton | C08L 83/04 524/588 |
| 2012/0022209 A1 | 1/2012 | Djurdjevic et al. | |
| 2012/0022210 A1 | 1/2012 | Davio et al. | |
| 2012/0123537 A1 | 5/2012 | Manesis et al. | |
| 2012/0214902 A1 | 8/2012 | Detemmerman et al. | |
| 2012/0214925 A1 | 8/2012 | Gubbels et al. | |
| 2012/0260974 A1 * | 10/2012 | Brecht | B32B 17/10761 438/66 |
| 2013/0323874 A1 * | 12/2013 | Furihata | B32B 17/10871 438/64 |
| 2013/0338289 A1 * | 12/2013 | Jadot | B32B 37/00 524/400 |
| 2014/0024731 A1 | 1/2014 | Blanc et al. | |
| 2014/0235812 A1 | 8/2014 | Brandstadt et al. | |
| 2014/0238471 A1 | 8/2014 | Wakita et al. | |
| 2014/0256539 A1 * | 9/2014 | Takei | C08G 77/38 502/170 |
| 2014/0350176 A1 | 11/2014 | Fisher et al. | |
| 2014/0364515 A1 | 12/2014 | Zeng et al. | |
| 2015/0007938 A1 | 1/2015 | Stanjek et al. | |
| 2015/0166859 A1 | 6/2015 | Choffat et al. | |
| 2015/0183951 A1 | 7/2015 | Bhagwagar et al. | |
| 2015/0224036 A1 | 8/2015 | Hasegawa et al. | |
| 2015/0257988 A1 | 9/2015 | Hasegawa et al. | |
| 2015/0263208 A1 * | 9/2015 | Fisher | H01L 31/0481 156/286 |
| 2015/0315437 A1 | 11/2015 | Albaugh et al. | |
| 2016/0009883 A1 | 1/2016 | Pernot | |
| 2016/0326415 A1 | 11/2016 | Jadot et al. | |
| 2017/0002201 A1 | 1/2017 | Von Malotki et al. | |
| 2017/0129987 A1 | 5/2017 | Burckhardt et al. | |
| 2018/0009951 A1 * | 1/2018 | Gubbels | C08G 77/08 |
| 2018/0237720 A1 | 8/2018 | Barnes et al. | |
| 2019/0144725 A1 * | 5/2019 | Chambard | E06B 3/6733 156/329 |
| 2019/0177486 A1 | 6/2019 | Baily et al. | |
| 2019/0177584 A1 | 6/2019 | Gubbels et al. | |
| 2019/0291024 A1 | 9/2019 | Rahma et al. | |
| 2019/0338077 A1 | 11/2019 | Chamard et al. | |
| 2020/0140617 A1 | 5/2020 | Gubbels et al. | |
| 2020/0190324 A1 | 6/2020 | Gubbels et al. | |
| 2020/0392431 A1 | 12/2020 | Ugazio et al. | |
| 2020/0399514 A1 * | 12/2020 | Gubbels | C09J 7/29 |

FOREIGN PATENT DOCUMENTS

| | | | |
|---|---|---|---|
| CN | 105505297 A | 4/2016 | |
| EP | 217501 A2 | 4/1987 | |
| EP | 341952 A2 | 11/1989 | |
| EP | 356210 A2 | 2/1990 | |
| EP | 393511 A2 | 10/1990 | |
| EP | 539234 A2 | 4/1993 | |
| EP | 0539234 B1 | 3/1997 | |
| EP | 2221328 A2 | 8/2010 | |
| EP | 2221329 A1 | 8/2010 | |
| EP | 2234172 A1 * | 9/2010 | ........... H01L 31/049 |
| EP | 2234172 A1 | 9/2010 | |
| EP | 2792690 A1 | 10/2014 | |

(56) References Cited

FOREIGN PATENT DOCUMENTS

| | | | | |
|---|---|---|---|---|
| GB | 903263 A | 8/1962 | | |
| GB | 903263 A * | 8/1962 | ....... | B32B 17/10798 |
| GB | 2424898 A | 10/2006 | | |
| JP | S5269460 A | 12/1978 | | |
| JP | H08269331 A | 10/1996 | | |
| JP | H08302193 A | 11/1996 | | |
| JP | 2000178448 A | 6/2000 | | |
| JP | 2000281523 A | 10/2000 | | |
| JP | 2001200161 A | 7/2001 | | |
| JP | 2002205911 A | 7/2002 | | |
| JP | 2002235004 A | 8/2002 | | |
| JP | 2003226812 A | 8/2003 | | |
| JP | 2006342327 A | 12/2006 | | |
| JP | 2007119695 A | 5/2007 | | |
| JP | 2008174554 A | 7/2008 | | |
| JP | 2010248446 A | 11/2010 | | |
| JP | 2011137119 A | 7/2011 | | |
| JP | 2011254116 A | 12/2011 | | |
| JP | 2012251058 A | 12/2012 | | |
| JP | 5180140 B2 | 4/2013 | | |
| JP | 2013234245 A | 11/2013 | | |
| JP | 5621211 B2 | 11/2014 | | |
| JP | 2016128497 A | 7/2016 | | |
| KR | 1020170034380 A | 3/2017 | | |
| WO | 2001042365 A1 | 6/2001 | | |
| WO | 2001096463 A1 | 12/2001 | | |
| WO | 2005108499 A1 | 11/2005 | | |
| WO | 2007117551 A1 | 10/2007 | | |
| WO | 2007117552 A1 | 10/2007 | | |
| WO | 2008045395 A2 | 4/2008 | | |
| WO | 2008045417 A2 | 4/2008 | | |
| WO | 2008045427 A1 | 4/2008 | | |
| WO | 2009013309 A1 | 1/2009 | | |
| WO | 2009128883 A1 | 10/2009 | | |
| WO | 2010071092 A1 | 6/2010 | | |
| WO | 2010115782 A2 | 10/2010 | | |
| WO | 2010117744 A2 | 10/2010 | | |
| WO | 2010143357 A1 | 12/2010 | | |
| WO | 2013036548 A3 | 3/2013 | | |
| WO | 2013100175 A1 | 7/2013 | | |
| WO | 2014022377 A1 | 2/2014 | | |
| WO | 2014075073 A1 | 5/2014 | | |
| WO | WO-2016120270 A1 * | 8/2016 | ............ | C09J 183/06 |
| WO | 2017030128 A1 | 2/2017 | | |
| WO | 2017191322 A1 | 11/2017 | | |
| WO | 2018024856 A1 | 2/2018 | | |
| WO | 2018024857 A1 | 2/2018 | | |
| WO | 2018024858 A1 | 2/2018 | | |
| WO | 2018024859 A1 | 2/2018 | | |
| WO | 2018024860 A1 | 2/2018 | | |
| WO | 2018024865 A1 | 2/2018 | | |
| WO | 2018050503 A1 | 3/2018 | | |
| WO | 2018200796 A1 | 11/2018 | | |
| WO | 2018208347 A1 | 11/2018 | | |

OTHER PUBLICATIONS

Michael A. Brook, Silicon in Organic, Organometallic and Polymer Chemistry, John Wiley & sons, Inc. (2000), p. 285.
Noll, W.; Chemistry and Technology of Silicones, Academic Press Inc., New York, 1968, pp. 397 and 399.
Lee, et al., 1970 Journal of Polymer Science Part A-2, Polymer Physics.
Michael A. Brook, Silicon in Organic, Organometallic and Polymer Chemistry, John Wiley & sons, Inc. (2000), pp. 285-287.
Mills, E., European Polymer Journal, 1969, vol. 5, pp. 675-695.
Noll, W.; Chemistry and Technology of Silicones, Academic Press Inc., New York, 1968, pp. 397-399.
O' Lenick, Jr., Basic Silicone Chemistry—A Review, Aug. 1999, Silicone Spectator, Jan. 2009.
International Search Report for Application No. PCT/EP2017/069743, dated Nov. 14, 2017, 3 pages.
International Search Report for Application No. PCT/EP2017/069744, dated Nov. 9, 2017, 3 pages.
International Search Report for Application No. PCT/EP2017/069745, dated Nov. 9, 2017, 3 pages.
International Search Report for Application No. PCT/EP2017/069746, dated Oct. 30, 2017, 4 pages.
International Search Report for Application No. PCT/EP2017/069748, dated Sep. 27, 2017, 4 pages.
International Search Report for Application No. PCT/EP2017/069749, dated Oct. 30, 2017, 4 pages.
International Search Report for Application No. PCT/EP2017/069753, dated Nov. 14, 2017, 3 pages.
Machine assisted English translation of CN105440693A obtained from https://patents.google.com/patent on Mar. 8, 2021, 6 pages.
Machine assisted English translation of CN105505297A obtained from https://patents.google.com/patent on Mar. 8, 2021, 10 pages.
Machine assisted English translation of CN1365379A obtained from https://patents.google.com/patent on Mar. 8, 2021, 12 pages.
Machine assisted English translation of JP5180140B2 obtained from https://patents.google.com/patent on Mar. 8, 2021, 10 pages.
Machine assisted English translation of JP5621211B2 obtained from https://patents.google.com/patent on Mar. 8, 2021, 10 pages.
Machine assisted English translation of JPS5269460A obtained from https://worldwide.espacenet.com/patent on Mar. 8, 2021, 10 pages.
Machine assisted English translation of JP2000178448A obtained from https://worldwide.espacenet.com/patent on Mar. 9, 2021, 8 pages.
Machine assisted English translation of JP2000281523A obtained from https://worldwide.espacenet.com/patent on Mar. 9, 2021, 19 pages.
Machine assisted English translation of JP2001200161A obtained from https://patents.google.com/patent on Mar. 8, 2021, 7 pages.
Machine assisted English translation of JP2002205911A obtained from https://patents.google.com/patent on Mar. 9, 2021, 10 pages.
Machine assisted English translation of JP2002235004A obtained from https://patents.google.com/patent on Mar. 9, 2021, 10 pages.
Machine assisted English translation of JP2003226812A obtained from https://patents.google.com/patent on Mar. 9, 2021, 13 pages.
Machine assisted English translation of JP2006342327A obtained from https://patents.google.com/patent on Mar. 8, 2021, 9 pages.
Machine assisted English translation of JP2007119695A obtained from https://patents.google.com/patent on Mar. 8, 2021, 9 pages.
Machine assisted English translation of JP2008174554A obtained from https://patents.google.com/patent on Mar. 9, 2021, 18 pages.
Machine assisted English translation of JP2012251058A obtained from https://patents.google.com/patent on Mar. 8, 2021, 16 pages.
Machine assisted English translation of JP2013234245A obtained from https://patents.google.com/patent on Mar. 8, 2021, 8 pages.
Machine assisted English translation of JP2016128497A obtained from https://patents.google.com/patent on Mar. 9, 2021, 15 pages.
Machine assisted English translation of WO2017030128A1 obtained from https://patents.google.com/patent on Mar. 8, 2021, 18 pages.
International Search Report for PCT/EP2016/051573 dated Mar. 11, 2016, 3 pages.
Machine assisted English translation of JPH08302193A obtained from https://patents.google.com/patent on Mar. 30, 2020, 8 pages.
Machine assisted English translation of JPH08269331A obtained from https://patents.google.com/patent on Mar. 30, 2020, 8 pages.
Machine assisted English translation of JP2010248446A obtained from https://patents.google.com/patent on Mar. 30, 2020, 11 pages.
Machine assisted English translation of JP2011137119A obtained from https://patents.google.com/patent on Mar. 30, 2020, 14 pages.
Machine assisted English translation of WO2010143357A1 obtained from https://patents.google.com/patent on Mar. 30, 2020, 25 pages.
International Search Report for PCT/US2018/017182 dated Apr. 16, 2018, 4 pages.

\* cited by examiner

LAMINATION PROCESS

CROSS-REFERENCE TO RELATED APPLICATIONS

This application is the National Stage of International Appl. No. PCT/US2018/017185 filed on 7 Feb. 2018, which claims priority to GB Appl. No. 1707439.4 filed on 9 May 2017, the content of which is hereby incorporated by reference.

The present disclosure generally relates to a lamination process for silicone based lamination adhesive compositions, in particular those which cure at or around room temperature.

None of the existing solutions for lamination of rigid substrates can be carried out at room temperature while providing durable adhesion and good light transmission.

Existing lamination solutions for rigid substrates such as glass substrates involve high temperature processing and in some cases high pressure conditions. For instance, a widespread method of laminating rigid substrates is to use a polyvinylbutyral (PVB) sheet that is melted and then solidified between two substrates. This approach requires a separate subsequent high temperature and high pressure step to remove any remaining entrapped air between the substrates. Another lamination solution for rigid substrates involves the use of a sheet of curable ethylene vinyl acetate (EVA). This approach requires large vacuum machines operating at high temperature (e.g. 150° C.) for a prolonged period of time (10 minutes or more). Moreover all these existing approaches have issues in terms of degradation of the material under weathering (e.g. yellowing and loss of light transmittance). Some approaches relying on a pure thermoplastic material (such as PVB) run the risk of relative creep of the two rigid substrates when exposed to elevated operating temperatures.

Silicone materials are preferable to those solutions because of better intrinsic stability of material properties. The potential use of condensation curing silicone compositions as lamination adhesives is attractive, because they cure at room temperature and therefore would be energy saving by avoiding the heat energy required to cure other systems such as hydrosilylation. They do however generate their own problems because by their chemical nature they release volatile by-products during the condensation cure process. The release of these volatile molecules cause the generation of bubbles in the body of the curing lamination adhesive which can be particularly problematic when the curing lamination adhesive is confined between gas impermeable substrate and superstrate, which is generally the case when using glass, metal or ceramic substrates and/or superstrates, but most easily seen when two panels of transparent material have bubbles trapped within the laminate thereby impairing vision through the laminate when in use.

In many instances silicone based materials such as elastomers or gels used as lamination adhesives must maintain adhesion to substrates and/or other materials. In electronics for example, gels are a special class of encapsulants that cure to form an extremely soft material. They are used to provide high levels of stress relief to sensitive circuitry. Both gels and elastomers perform many important functions in electronics. Their major job is to protect electronic assemblies and components from adverse environments by: functioning as dielectric insulation, protecting the circuit from moisture and other contaminants, relieving mechanical and thermal stress on components In such situations the gels are required to adhere to electronic and electrical components and printed circuit boards in addition to the electrical connectors and conductors that pass through the coating or encapsulating material.

The materials used as such lamination adhesives are largely based on addition cure chemistry, i.e. they are cured by the reaction of a silicon hydride group with onto an unsaturated carbon radical with the help of a catalyst, which is typically a platinum based compound. Historically the industry has preferred addition cure compositions of this type for these applications because they immediately cure throughout the body of the compound resulting in a cured gel material in a matter of minutes whilst condensation cure systems are significantly slower, titanate cured condensation processes can take e.g. up to 7 days curing per 6 mm of depth of the body of the uncured material. Whilst from a cure speed standpoint silicone based materials made from these hydrosilylation cure compositions are excellent, there are several potential problems and/or disadvantages with the use of these types of products. Firstly they are generally cured at elevated temperature (i.e. temperatures significantly above room temperature). The hydrosilylation compositions can be contaminated and rendered uncurable due to inactivation of the platinum based cure catalysts. The platinum catalysts are sensitive and may be poisoned by amine containing compounds, sulphur containing compounds and phosphorus containing compounds.

To formulate multi component condensation cured silicone elastomers tin or zinc catalyst are typically used, e.g. dibutyl tin dilaurate, tin octoate, zinc octoate (Noll, W.; Chemistry and Technology of Silicones, Academic Press Inc., New York, 1968, p. 397). Whilst, tin cured condensation systems do cure over a relatively short period, they are not desired for e.g. electronics applications because they can undergo reversion (i.e. depolymerisation) at temperatures above 80° C. Furthermore, tin catalysed compositions need a moisture carrying ingredient, typically the filler to enable curing.

It is well known to people skilled in the art that alkoxy titanium compounds—i.e. alkyl titanates—are suitable catalysts for formulating one component moisture curable silicones (References: Noll, W.; Chemistry and Technology of Silicones, Academic Press Inc., New York, 1968, p. 399, Michael A. Brook, silicon in organic, organometallic and polymer chemistry, John Wiley & sons, Inc. (2000), p. 285). Titanate catalysts have been widely described for their use to formulate skin or diffusion cured one part curing silicone elastomers.

A typical process developed for lamination with silicone based lamination adhesives is to apply the lamination adhesive on both substrates to be laminated together in a suitable pattern e.g. parallel strips, then a dam of e.g. hot melt material is applied around the periphery of one substrate surface to prevent leakage of the lamination adhesive pre-cure sandwiched between the substrates. The resulting pre-cured assembly is then placed under vacuum for about 7 minutes, followed by applying pressure for about 2 minutes and finally releasing the pressure and vacuum and curing the lamination adhesive. This process is applicable, but can lead sometime to leakages, which whilst acceptable when using a heat cure material because it is effectively then cured immediately at high temperature. However, if a room temperature silicone is used, then leakage can occur later on during the curing process.

Laminates are often used to provide protection from environmental factors such as wind and rain. However, in many applications, air bubbles may be trapped in the cured lamination adhesive which may weaken the mechanical, electrical, and aesthetic properties of the optoelectronic elements and electronic articles. Accordingly, there remains an opportunity to improve such laminates by minimising and preferably negating the presence of leakages and bubbles.

A process has been developed to produce laminated assemblies, particularly for use with room temperature curing lamination adhesives systems, without leaks, voids or bubbles, in a relatively short time frame.

There is provided a process for making a laminate assembly comprising a cured lamination adhesive sandwiched between two substrates comprising the steps of:—
(i) providing a dam of sealant or the like around the periphery of a first substrate;
(ii) introducing a flowable silicone based lamination adhesive onto the first substrate having the dam of sealant around the periphery thereof;
(iii) placing a second substrate on top of the first substrate to form a pre-cured assembly, trapping the flowable silicone based lamination adhesive between the first and second substrates;
(iv) applying a vacuum to the pre-cured assembly of step (iii);
(v) press the pre-cured assembly of step (iv) at a pre-determined pressure whilst maintaining the vacuum;
(vi) release the pre-determined pressure of step (v) whilst maintaining the vacuum for a period sufficient to ensure that there is provided a continuous layer of flowable silicone based lamination adhesive between said first and second substrates as defined by the peripheral dam of sealant;
(vii) repeat step (v) and then release the pressure and vacuum and cure the pre-cured assembly.

It was found that repeating step (v) helped to more reliably produce unblemished laminate assemblies having no leaks or bubbles or the like. Indeed step (v) and (vi) may be repeated on several occasions if deemed necessary.

Depending on the end use of the laminate assembly one or more objects may be attached, inserted or embedded in the lamination adhesive layer between the first and second substrates so that the object(s) is (are) effectively encapsulated within the cured lamination adhesive layer in the laminated assembly. The objects might be, for the sake of example, textiles, decorations, electronics, LEDs, photovoltaic cells or any e.g. wires and/or other connectors or the like. Hence, when the end-application for the laminated assembly is as an electronic body the lamination adhesive may be utilised to encapsulate solar cells or wires etc. attached or placed on the surfaces of the first or second substrates pre the lamination process.

If required a first side of the second substrate may also be pre-coated with the flowable silicone based lamination adhesive prior to being placed first side down onto the first substrate in step (iii) of the process, i.e. such that the flowable silicone based lamination adhesive is applied to both the first and second substrate and is then sandwiched there between within the region defined by the dam applied to the first substrate. Gases present in the uncured lamination adhesive layer between the first and second substrates are removed during the vacuum steps and the lamination adhesive may commence cure during the compression steps.

The resulting laminated assembly is self-healing: small bubbles that are possibly present immediately after lamination disappear after a while. Compared to traditional glass encapsulation methods, e.g. those which use filmic lamination adhesives, the method requires low capital expenditure (e.g. no autoclave, possibly no heating). This latter advantage means that higher lamination throughputs can be achieved than with traditional lamination techniques and adhesives as the resulting laminates may be manipulated immediately after lamination as no or minimal cooling is required.

The dam utilised to minimise leakage may be made from a hot melt silicone, or a hot melt polyisobutylene (PIB) especially in the latter case there is a need to minimise gas and moisture permeability. Alternatively the dam may be manufactured using a silicone sealant material, providing it has sufficient green strength (the strength of the sealant used in an assembled construction before the sealant has fully cured). Afterwards the dam material may be either retained or removed dependent on its end use. In situations where it is not removed after completion of the process, the dam material is utilised as an external protective seal around the outside of the cured lamination adhesive. Alternatively the dam may be removed alone or even in combination with the after the cure is complete to achieve the required dimensional and visual properties of the assembly. A vapour barrier might also be utilized in or on the aforementioned sealant material.

The flowable silicone based lamination adhesive may be applied onto substrate surfaces by any suitable method for example using a suitable dispenser such as for example curtain coaters, spray devices die coaters, dip coaters, extrusion coaters, knife coaters and screen coaters. Typically the flowable silicone based lamination adhesive will have a viscosity of from about 100 mPa·s at 25° C. up to 100,000 mPa·s at 25° C., alternatively up to 50,000 mPa·s at 25° C., alternatively up to 30,000 mPa·s at 25° C. It is deposited in a pattern defining at least one passage extending from an interior of the pre-cured assembly to a perimeter of the pre-cured assembly. The pattern is not particularly limited and may be further described as a geometric, non-geometric, uniform or non-uniform pattern. A whole or a portion of the pattern may be described as straight, zig-zag, herringbone, circular or oval, triangular, whorl-shaped, ribbon-shaped, marble, spiral-shaped, coil-shaped, curl-shaped, twisted, looped, helix, serpentine, sinusoidal, winding, star shaped, "x" shaped, and/or random. In one embodiment, the curable silicone composition is deposited in one, two, or a plurality of rows. One or more of the rows may be disposed substantially parallel or traverse (i.e., at an angle) with one or more other rows. For example, the passages formed in or from the lamination adhesive may extend to opposing or different locations on the perimeter of the pre-cured assembly. This may be achieved based on the disposition of the one or more rows of the curable silicone composition. Application of the lamination adhesive in a plurality of rows or in a central pool is particularly preferred.

It is typically anticipated that step (iv) of the process may be of a duration of from 15 seconds to 1.5 minutes, alternatively 15 seconds to 1 minute, but will typically be of a duration between 20 seconds and 1 minute, e.g. approximately 30 seconds.

It is believe that the time period for step (v) will be dependent on several factors, not least the substrates involved their surface area and the volume and the viscosity of the flowable silicone based lamination adhesive used. That said a period of from 45 seconds to 3 minutes is typically anticipated as sufficient.

It is believed that the time period for step (vi) is likely to be similar to that of step (iv) and likewise the time period for step (vii) will be similar to that of step (v).

Typically the pressure applied will be determined on factors such as the substrates used but is anticipated to typically be in the range of 10,000 Pa to 400,000 Pa and will be similar for both steps (vi) and (vi).

Whilst a pre-cured assembly prepared in accordance with the above process is effectively turned into a laminated assembly by the end of the lamination process it is to be appreciated that in the case of room temperature cure systems (condensation cure), the curing process may continue post-lamination hence the ability to remove bubbles created during lamination. However the lamination adhesive is designed to have sufficient green strength to avoid delamination during the completion of the cure process post lamination.

Whilst this process was designed with regards avoiding bubbles and the like in room temperature cure systems it has been found to work equally well for other silicone cure systems such as hydrosilylation cure systems which will typically require heat during the cure process. However, preferably prior to curing the whole of the above process is undertaken at room temperature.

The substrates may be made from e.g. glass, wood, stone, plastics, composites, metals, and/or ceramics or the like etc. however given the crystal clear nature of the lamination adhesive post lamination it is preferred that at least one of the first or second substrates is transparent. Glass substrates used may if necessary be may be whiteboard glass, soda-lime glass and the like.

Spacers may be used to maintain the first and second substrates a pre-defined distance apart and to dictate the volume to be filled by the lamination adhesive introduced during the process as hereinbefore described.

Although the described solution is for the lamination of two rigid substrates, it is understood that the same solution can be used to encapsulate flat objects, within the lamination adhesive, between two rigid substrates. This might be an ornamental flat object, such as a fabric or an object made from wood, plastic, ceramic, natural stone or metal. Alternatively, the object might be a "functional" layer such as an array of photovoltaic cells, or a flat LED assembly, or an electronic display, a liquid crystals assembly, as well.

The laminated assembly may be processed post-lamination and/or post-cure if necessary, e.g. for tempering, surface anti-reflection, ultraviolet ray-blocking or the like.

One notable advantage of the present lamination process with a room temperature cure lamination adhesive is that because the composition cures at room temperature or moderate temperatures enables the lamination of temperature-sensitive components, which are otherwise difficult to laminate because of the temperatures required to be reached during the lamination process.

Highly viscous condensation cure compositions e.g. >50,000 mPa·s at 25° C. compositions possess the advantage that they can be applied on both panes prior to assembly, which can facilitate speed up the lamination process, but such highly viscous compositions more easily entrap air and bubbles during the curing process. In contrast whilst low viscosity formulations possess the advantage to release more easily voids and bubbles, they require a greater proportion of crosslinker, which can lead to more effluent released by the cure process.

Laminated assemblies manufactured using the lamination process as hereinbefore described may initially have visible bubbles within the lamination adhesive layer between the first and second substrates during and/or immediately after completion of the lamination process disappear shortly thereafter due to the cure process of the lamination adhesive itself post-lamination. Compared to traditional glass encapsulation methods, lamination using the room temperature cure systems have only low capital expenditure requirements (e.g. no autoclave and typically no heating). This latter advantage means that higher lamination throughputs can be achieved than with traditional lamination techniques and adhesives as the resulting laminates may be manipulated immediately after lamination as no or minimal cooling is required.

For the avoidance of doubt, the step of compressing may include applying a mechanical weight, press, or roller (e.g. a pinch roller). The step of compressing may be further defined as applying a force on the interior (e.g. at the center) of the laminated assembly or any one or more layers of components. This force may be moved towards the perimeter or edges of the article. For example, this force may be applied at the center and then moved outwards to assist in the evacuation of air from the article.

As hereinbefore described the step of applying a vacuum is performed independent of the of compressing in steps (iv) and (vi) of the process and includes the need to simultaneously applying a vacuum and a compression force to evacuate the air from the interior of the pre-cured assembly to the perimeter of the pre-cured assembly in steps (v) and (vii) through the at least one passage to form a compressed layer of the curable lamination adhesive in the pre-cured assembly and subsequently curing the lamination adhesive via the appropriate cure method.

During compression the lamination adhesive composition commences cure and air escapes from the interior of the pre-cured lamination assembly to the perimeter of the pre-cured lamination assembly through the at least one passage. For example, the air may escape or may be evacuated during steps (iii) to (vi) of the method hereinbefore described. The escape of the air through the at least one passage allows the laminated assembly to be formed with minimal to no visible defects. In one embodiment, the laminated assembly is substantially and more preferably totally free of bubbles.

The cure process for the laminated assembly may be undertaken in any suitable manner required but is typically determined by the chemical nature of the cure process, i.e. is dependent on the type of silicone lamination adhesive used but may take place for example at room temperature (typically condensation cure systems, at elevated temperatures, e.g. above 60° C., (typically hydrosilylation cure or free radical cure systems) or by a UV exposure treatment to cure the silicone composition. Given pre-cured assemblies are involved in the cure process cure processes at elevated temperatures may be undertaken using a continuous process involving a continuous oven and/or furnace if desired.

Hence, the flowable silicone based lamination adhesive can be further defined as being, including, consisting essentially of, or consisting of, a hydrosilylation-curable silicone composition, a condensation-curable silicone composition, and/or free-radical curable silicone composition such as a radiation-curable silicone composition and a light (e.g. UV light) curable composition, and a peroxide-curable silicone composition. The terminology "consisting essentially of" describes an embodiment wherein the curable silicone composition is curable by one type of curing mechanism and is free of one or more compositions that are curable by a different curing mechanism.

A condensation-curable silicone composition typically includes a polyorganosiloxane having an average of at least two silicon-bonded hydrogen atoms, hydroxy groups, or hydrolysable groups per molecule and, optionally, a cross-linking agent having silicon-bonded hydrolysable groups and/or a condensation catalyst.

Condensation-curable silicone compositions cure depending on the nature of the silicon-bonded groups in the polyorganosiloxane. For example, when the polyorganosiloxane includes silicon-bonded hydroxy groups, the composition can be cured (i.e., cross-linked) by heating the composition. The composition can typically be cured by heating it at a temperature of from 50 to 250° C., for a period of from 1 to 50 hours. When the condensation-curable silicone composition includes a condensation catalyst, the composition is typically cured at room temperature (about 23±2° C.). If desired cure can be further accelerated by application of heat and/or exposure to high humidity, however the use of a condensation catalyst and room temperature cure processes are preferred.

Any suitable condensation cure composition may be utilised in the present invention however it was found that a lamination adhesive of the following composition was particularly suited to the process as described herein:

A multiple part condensation curable lamination adhesive composition based on titanate/zirconate cure catalysts comprising components:—
(i) at least one condensation curable silyl terminated polymer having at least one, typically at least 2 hydrolysable and/or hydroxyl functional groups per molecule;
(ii) a cross-linker selected from the group of
  silanes having at least 2 hydrolysable groups, alternatively at least 3 hydrolysable groups per molecule group; and/or
  silyl functional molecules having at least 2 silyl groups, each silyl group containing at least one hydrolysable group
(iii) a condensation catalyst selected from the group of titanates, zirconates;
wherein polymer (i), is not stored in the same part as cross-linker (ii) and catalyst (iii); and characterised in that condensation catalyst (iii) is present in a molar amount which is at least 50% of the moisture present cumulatively in the parts of the composition and in that the molar ratio of silicon bonded hydroxyl groups in polymer (i) to hydrolysable groups in crosslinker (ii) is above 0.15; and the molar ratio of the silicon bonded hydroxyl groups in polymer (i) to M-OR functions is greater than 10, where M is titanium or zirconium.

The multiple part condensation curable lamination adhesive composition as described above may consist of components (i), (ii) and (iii) and one or more additives selected from pigments, dyes, adhesion promoters, light diffusing particles, siloxane resins and/or particles with fire resistant properties.

One advantage of these compositions in the process as defined herein are that whilst they cure at room temperature, to form elastomers or gels with the catalyst utilised (condensation) they are more resistant to contaminants than platinum cure silicones and provide, unlike tin catalysed compositions a resistance to reversion when subjected to high temperature and high humidity but they also self-eradicate bubbles which form during the lamination adhesive cure process thereby allowing for use in transparent laminate applications. For the avoidance of doubt the term "bubble" is used to describe an enclosed volumetric space within the layer of silicone encapsulant wherein the enclosed volumetric space contains at least some quantity of gaseous or vaporous substance The total silicon bonded hydroxyl (Si—OH) molar content is calculated for 100 g of the mixed formulation. The silicon bonded hydroxyl molar content related to a polymer is equal to the amount in g of hydroxyl containing polymer in 100 g of the mixed product divided by the average molecular weight in number of the polymer multiply by the average number of hydroxyl functions present in the polymer, typically 2. If there are several hydroxyl functional polymers in the formulation, the sum of the molar content of each polymer is sum up to constitute the total silanol molar content in the formulation.

The total hydrolysable groups molar content is calculated for 100 g of the mixed formulation. The molar content of hydrolysable groups related to a substance is equal to the amount in g of the molecule that contains the hydrolysable groups in 100 g of the mixed product divided by the molecular weight of the molecule or the average molecular weight in number in case it is a polymeric molecule multiply by the average number of hydrolysable functions present in the molecule. The sum of the molar content of each molecule or polymer is sum up to constitute the total molar content of hydrolysable groups in the formulation.

The molar ratio of silicon bonded hydroxyl groups in polymer (i) to hydrolysable groups from cross-linker (ii) is then calculated by dividing the total molar content of silicon bonded hydroxyl (Si—OH) groups in polymer (i) by the total molar content of hydrolysable groups from cross-linker (ii). The value of the ratio is >0.15, i.e. >0.15:1. The 0.15 value is largely for polymers having a low viscosity e.g. ≤30,000 mPa·s at 25° C. However, for polymers having a higher viscosity e.g. >30,000 mPa·s at 25° C. the value of the ratio is >0.5, i.e. >0.5:1.

The moisture (water) content of the composition was determined, in the absence of filler, using a Metrohm coulometric Karl Fischer titrator (model 831) using the oven sample processor headspace (774) at 110° C. The moisture content of filler, when present, was determined in accordance with ISO 787-2:1981 as discussed below.

Polymer (i) is at least one moisture/condensation curable silyl terminated polymer. Any suitable moisture/condensation curable silyl terminated polymer may be utilised including polydialkyl siloxanes, alkylphenyl siloxane, or organic based polymers with silyl terminal groups e.g. silyl polyethers, silyl acrylates and silyl terminated polyisobutylenes or copolymers of any of the above. Preferably the polymer is a polysiloxane based polymer containing at least two hydroxyl or hydrolysable groups, most preferably the polymer comprises terminal hydroxyl or hydrolysable groups. Examples of suitable hydroxyl or hydrolysable groups include —Si(OH)$_3$, —(R$^a$)Si(OH)$_2$, —(R$^a$)$_2$Si(OH), —R$^a$Si(OR$^b$)$_2$, —Si(OR$^b$)$_3$, —R$^a{}_2$SiOR$^b$ or —(R$^a$)$_2$Si—R$^c$—SiR$^d{}_p$(OR$^b$)$_{3-p}$ where each R$^a$ independently represents a monovalent hydrocarbyl group, for example, an alkyl group, in particular having from 1 to 8 carbon atoms, (and is preferably methyl); each R$^b$ and R$^d$ group is independently an alkyl or alkoxy group in which the alkyl groups suitably have up to 6 carbon atoms; R$^c$ is a divalent hydrocarbon group which may be interrupted by one or more siloxane spacers having up to six silicon atoms; and p has the value 0, 1 or 2.

Preferably polymer (i) has the general formula $$X^3\text{-}A\text{-}X^1 \quad (1)$$

where X$^3$ and X$^1$ are independently selected from siloxane groups which terminate in hydroxyl or hydrolysable groups and A is a siloxane and/or organic containing polymeric chain, alternatively a siloxane polymeric chain.

Examples of hydroxyl-terminating or hydrolysable groups X$^3$ or X$^1$ include —Si(OH)$_3$, —(R$^a$)Si(OH)$_2$, —(R$^a$)$_2$Si(OH), —(R$^a$)Si(OR$^b$)$_2$, —Si(OR$^b$)$_3$, —(R$^a$)$_2$SiOR$^b$ or —(R$^a$)$_2$Si—R$^c$—Si(R$^d$)$_p$(OR$^b$)$_{3-p}$ as defined above with each $R^b$ group, when present, typically being a methyl group. Preferably the $X^3$ and/or $X^1$ terminal groups are hydroxydialkyl silyl groups, e.g. hydroxydimethyl silyl groups or alkoxydialkyl silyl groups e.g. methoxydimethyl silyl or ethoxydimethyl silyl.

Examples of suitable siloxane groups in polymeric chain A of formula (I) are those which comprise a polydiorganosiloxane chain. Thus polymeric chain A preferably includes siloxane units of formula (2)

$$—(R^5{}_sSiO_{(4-s)/2})—\qquad(2)$$

in which each $R^5$ is independently an organic group such as a hydrocarbyl group having from 1 to 10 carbon atoms optionally substituted with one or more halogen group such as chlorine or fluorine and s is 0, 1 or 2. Particular examples of groups $R^5$ include methyl, ethyl, propyl, butyl, vinyl, cyclohexyl, phenyl, tolyl group, a propyl group substituted with chlorine or fluorine such as 3,3,3-trifluoropropyl, chlorophenyl, beta-(perfluorobutyl)ethyl or chlorocyclohexyl group. Suitably, at least some and preferably substantially all of the groups $R^5$ are methyl.

Typically the polymers of the above type will have a viscosity in the order of 1000 to 300 000 mPa·s, alternatively 1000 to 100 000 mPa·s at 25° C. measured by using a Brookfield cone plate viscometer (RV DIII) using a cone plate.

Preferred polysiloxanes containing units of formula (2) are thus polydiorganosiloxanes having terminal, silicon-bound hydroxyl groups or terminal, silicon-bound organic radicals which can be hydrolysed using moisture as defined above. The polydiorganosiloxanes may be homopolymers or copolymers. Mixtures of different polydiorganosiloxanes having terminal condensable groups are also suitable.

In accordance with the present invention polymeric chain A may alternatively be organic based polymers with silyl terminal groups e.g. silyl polyethers, silyl acrylates and silyl terminated polyisobutylenes. In the case of silyl polyethers the polymer chain is based on polyoxyalkylene based units. Such polyoxyalkylene units preferably comprise a linear predominantly oxyalkylene polymer comprised of recurring oxyalkylene units, (—$C_nH_{2n}$—O—) illustrated by the average formula (—$C_n$—$H_{2n}$—O—)$_y$ wherein n is an integer from 2 to 4 inclusive and y is an integer of at least four. The average molecular weight of each polyoxyalkylene polymer block may range from about 300 to about 10,000, but can be higher in molecular weight. Moreover, the oxyalkylene units are not necessarily identical throughout the polyoxyalkylene monomer, but can differ from unit to unit. A polyoxyalkylene block, for example, can be comprised of oxyethylene units, (—$C_2H_4$—O—); oxypropylene units (—$C_3H_6$—O—); or oxybutylene units, (—$C_4H_8$—O—); or mixtures thereof.

Other polyoxyalkylene units may include for example: units of the structure

-[—$R^e$—O—(—$R^f$—O—)$_p$-Pn-C$R^g{}_2$-Pn-O—(—$R^f$—O—)$_q$—$R^e$—]— in which Pn is a 1,4-phenylene group, each $R^e$ is the same or different and is a divalent hydrocarbon group having 2 to 8 carbon atoms, each $R^f$ is the same or different and, is, an ethylene group or propylene group, each $R^g$ is the same or different and is, a hydrogen atom or methyl group and each of the subscripts p and q is a positive integer in the range from 3 to 30.

For the purpose of this application "substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulphur atoms; and sulphur atom containing groups such as mercapto groups.

The backbone of the organic polymer (A) which may contain organic leaving groups within the molecule used in the present invention is not particularly limited and may be any of organic polymers having various backbones. The backbone preferably includes at least one selected from a hydrogen atom, a carbon atom, a nitrogen atom, an oxygen atom, and a sulphur atom because the resulting composition has excellent curability and adhesion.

Crosslinkers (ii) that can be used are generally moisture curing
silanes having at least 2 hydrolysable groups, alternatively at least 3 hydrolysable groups per molecule group; and/or
silyl functional molecules having at least 2 silyl groups, each silyl group containing at least one hydrolysable group.

Typically, a cross-linker requires a minimum of 2 hydrolysable groups per molecule and preferably 3 or more. In some instances, the crosslinker (ii) having two hydrolysable groups may be considered a chain extender. The crosslinker (ii) may thus have two but alternatively has three or four silicon-bonded condensable (preferably hydroxyl and/or hydrolysable) groups per molecule which are reactive with the condensable groups in organopolysiloxane polymer (i).

For the sake of the disclosure herein silyl functional molecule is a silyl functional molecule containing two or more silyl groups, each silyl group containing at least one hydrolysable group. Hence, a disilyl functional molecule comprises two silicon atoms each having at least one hydrolysable group, where the silicon atoms are separated by an organic or siloxane spacer. Typically, the silyl groups on the disilyl functional molecule may be terminal groups. The spacer may be a polymeric chain.

For the sake of the disclosure herein a disilane is a silyl functional molecule having at least 2 silyl groups where the two silicon atoms are bonded to one another.

The hydrolysable groups on the silyl groups include acyloxy groups (for example, acetoxy, octanoyloxy, and benzoyloxy groups); ketoximino groups (for example dimethyl ketoximo, and isobutylketoximino); alkoxy groups (for example methoxy, ethoxy, and propoxy) and alkenyloxy groups (for example isopropenyloxy and 1-ethyl-2-methylvinyloxy). In some instances, the hydrolysable group may include hydroxyl groups.

The silane cross-linker (ii) include alkoxy functional silanes, oximosilanes, acetoxy silanes, acetonoxime silanes, enoxy silanes.

When the crosslinker is a silane and when the silane has only three silicon-bonded hydrolysable groups per molecule, the fourth group is suitably a non-hydrolysable silicon-bonded organic group. These silicon-bonded organic groups are suitably hydrocarbyl groups which are optionally substituted by halogen such as fluorine and chlorine. Examples of such fourth groups include alkyl groups (for example methyl, ethyl, propyl, and butyl); cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. The fourth silicon-bonded organic groups may be methyl.

A typical silane may be described by formula (3)

$$R''_{4-r}Si(OR^5)_r \qquad (3)$$

wherein $R^5$ is described above and r has a value of 2, 3 or 4. Typical silanes are those wherein R" represents methyl, ethyl or vinyl or isobutyl. R" is an organic radical selected from linear and branched alkyls, allyls, phenyl and substituted phenyls, acetoxy, oxime. In some instances, $R^5$ represents methyl or ethyl and r is 3.

Another type of suitable crosslinkers (ii) are molecules of the type $Si(OR^5)_4$ where $R^5$ is as described above, alternatively propyl, ethyl or methyl. Partials condensates of $Si(OR^5)_4$ may also be considered.

In one embodiment the cross-linker (ii) is a silyl functional molecule having at least 2 silyl groups each having at least 1 and up to 3 hydrolysable groups, alternatively each silyl group has at least 2 hydrolysable groups.

The crosslinker (ii) may be a disilyl functional polymer, that is, a polymer containing two silyl groups, each containing at least one hydrolysable group such as described by the formula (4)

$$Si(OR^7)_y R\nu Si(OR^7)_z \qquad (4)$$

where y and z are independently an integer of 1, 2 or 3, alternatively 2 or 3. Rv is an organic or polysiloxane-based fragment.

The silyl (e.g. disilyl) functional crosslinker (ii) may have a siloxane or organic polymeric backbone. In the case of such siloxane or organic based cross-linkers the molecular structure can be straight chained, branched, cyclic or macromolecular. Suitable polymeric crosslinkers (ii) may have a similar polymeric backbone chemical structure to polymeric chain A as depicted in formula (1) above. In the case of siloxane based polymers the viscosity of the cross-linker will be within the range of from 0.5 mPa·s to 80,000 mPa·s at 25° C.

Examples of disilyl polymeric crosslinkers (ii) with a silicone or organic polymer chain bearing alkoxy functional end groups include polydimethylsiloxanes having at least one trialkoxy terminal where the alkoxy group may be a methoxy or ethoxy group.

Crosslinkers (ii) thus include alkyltrialkoxysilanes such as methyltrimethoxysilane (MTM) and methyltriethoxysilane, tetraethoxysilane, partially condensed tetraethoxysilane, alkenyltrialkoxy silanes such as vinyltrimethoxysilane and vinyltriethoxysilane, isobutyltrimethoxysilane (iBTM). Other suitable silanes include ethyltrimethoxysilane, vinyltriethoxysilane, phenyltrimethoxysilane, alkoxytrioximosilane, alkenyltrioximosilane, 3,3,3-trifluoropropyltrimethoxysilane, methyltriacetoxysilane, vinyltriacetoxysilane, ethyl triacetoxysilane, di-butoxy diacetoxysilane, phenyl-tripropionoxysilane, methyltris(methylethylketoximo)silane, vinyltris-methylethylketoximo)silane, methyltris(methylethylketoximino)silane, methyltris(isopropenoxy)silane, vinyltris (isopropenoxy)silane, ethylpolysilicate, n-propylorthosilicate, ethylorthosilicate, dimethyltetraacetoxydisiloxane, oximosilanes, acetoxy silanes, acetonoxime silanes, enoxy silanes and other such trifunctional alkoxysilanes as well as partial hydrolytic condensation products thereof; 1,6-bis(trimethoxysilyl)hexane (alternatively known as hexamethoxydisilylhexane), bis(trialkoxysilylalkyl)amines, bis(dialkoxyalkylsilylalkyl)amine, bis [trialkoxysilylalkyl)N-alkylamine, bis [dialkoxyalkylsilylalkyl)N-alkylamine, bis (trialkoxysilylalkyl)urea, bis(dialkoxyalkylsilylalkyl) urea, bis[3-trimethoxysilylpropyl)amine, bis[3-triethoxysilylpropyl)amine, bis[4-trimethoxysilylbutyl)amine, bis[4-triethoxysilylbutyl)amine, bis[3-trimethoxysilylpropyl)N-methylamine, bis[3-triethoxysilylpropyl)N-methylamine, bis[4-trimethoxysilylbutyl)N-methylamine, bis[4-triethoxysilylbutyl)N-methylamine, bis[3-trimethoxysilylpropyl) urea, bis[3-triethoxysilylpropyl)urea, bis[4-trimethoxysilylbutyl)urea, bis[4-triethoxysilylbutyl)urea, bis[3-dimethoxymethylsilylpropyl)amine, bis[3-diethoxymethyl silylpropyl)amine, bis[4-dimethoxymethylsilylbutyl)amine, bis[4-diethoxymethyl silylbutyl)amine, bis[3-dimethoxymethylsilylpropyl)N-methylamine, bis[3-diethoxymethyl silylpropyl)N-methylamine, bis[4-dimethoxymethylsilylbutyl)N-methylamine, bis[4-diethoxymethyl silylbutyl)N-methylamine, bis[3-dimethoxymethylsilylpropyl)urea, bis [3-diethoxymethyl silylpropyl)urea, bis[4-dimethoxymethylsilylbutyl)urea, bis[4-diethoxymethyl silylbutyl)urea, bis[3-dimethoxyethylsilylpropyl)amine, bis [3-diethoxyethyl silylpropyl)amine, bis[4-dimethoxyethylsilylbutyl)amine, bis[4-diethoxyethyl silylbutyl)amine, bis [3-dimethoxyethylsilylpropyl)N-methylamine, bis[3-diethoxyethyl silylpropyl)N-methylamine, bis[4-dimethoxyethylsilylbutyl)N-methylamine, bis[4-diethoxyethyl silylbutyl)N-methylamine, bis[3-dimethoxyethylsilylpropyl)urea bis[3-diethoxyethyl silylpropyl)urea, bis[4-dimethoxyethylsilylbutyl)urea and/or bis[4-diethoxyethyl silylbutyl)urea; bis(triethoxysilylpropyl)amine, bis(trimethoxysilylpropyl)amine, bis[trimethoxysilylpropyl)urea, bis[triethoxysilylpropyl)urea, bis (diethoxymethylsilylpropyl)N-methylamine; Di or Trialkoxy silyl terminated polydialkyl siloxane, di or trialkoxy silyl terminated polyarylalkyl siloxanes, di or trialkoxy silyl terminated polypropyleneoxide, polyurethane, polyacrylates; polyisobutylenes; Di or triacetoxy silyl terminated polydialkyl; polyarylalkyl siloxane; Di or trioximino silyl terminated polydialkyl; polyarylalkyl siloxane; Di or triacetonoxy terminated polydialkyl or polyarylalkyl.

The composition further comprises a condensation catalyst (iii) which increases the speed at which the composition cures. The catalyst chosen for inclusion in a particular silicone sealant composition depends upon the speed of cure required. Titanate and/or zirconate based catalysts may comprise a compound according to the general formula $Ti[OR^{22}]_4$ $Zr[OR^{22}]_4$ where each $R^{22}$ may be the same or different and represents a monovalent, primary, secondary or tertiary aliphatic hydrocarbon group which may be linear or branched containing from 1 to 10 carbon atoms. Optionally the titanate may contain partially unsaturated groups. However, preferred examples of $R^{22}$ include for example to methyl, ethyl, propyl, isopropyl, butyl, tertiary butyl and a branched secondary alkyl group such as 2, 4-dimethyl-3-pentyl. Preferably, when each $R^{22}$ is the same, $R^{22}$ is an isopropyl, branched secondary alkyl group or a tertiary alkyl group, in particular, tertiary butyl. Suitable examples include for the sake of example, tetra n-butyl titanate, tetra t-butyl titanate, tetra t-butoxy titanate, tetraisopropoxy titanate and diisopropoxydiethylacetoacetate titanate. Alternatively, the titanate may be chelated. The chelation may be with any suitable chelating agent such as an alkyl acetylacetonate such as methyl or ethylacetylacetonate. Alternatively, the titanate may be monoalkoxy titanates bearing three chelating agents such as for example 2-propanolato, tris isooctadecanoato titanate. The catalyst is present in a molar amount which is at least 50% of the molar amount of moisture (i.e. water) present cumulatively in Part A and Part B of the composition.

In one embodiment the multiple part condensation curable lamination adhesive composition as hereinbefore described consists of components (i), (ii) and (iii) and one or more additives selected from pigments, dyes, adhesion promoters, light diffusing particles, and/or siloxane resins. Typically such additives are present in the amount of no more than about 5% by weight of the total composition.

Optional Additives

Fillers

Considering that the main attribute of the lamination adhesive composition as hereinbefore described is its transparency, the lamination adhesive composition itself does not typically contain any inorganic filler or indeed any other additives that would potentially impact its transparency. However, if both the substrate and superstrate are non transparent, the composition herein described may be produced including these materials. Alternatively, the lamination adhesive composition described herein does not contain any inorganic filler of any sort. When filler is present the moisture content thereof is determined utilising the test method described in ISO 787-2:1981. The test method involves placing an empty glass container of 100 ml in an oven at 105° C. for a two hour period. The container was then put in a desiccator until it reached room temperature. The glass container is then weighed accurately (W1) after which about 1 g of filler is introduced in to the container and the weight of the container+filler was accurately measured (W2). The glass container with fillers was placed in the oven at 105° C. for a further 2 hours. The glass container containing the filler was then placed in a desiccator until reaching room temperature and was accurately re-weighed (W3). The moisture content of the filler was then calculated using the following formula:

Moisture content (%)=100×($W3-W2$)/($W2-W1$).

Siloxane Resins

Siloxane resins comprising $R^2{}_3SiO_{1/2}$ units and $SiO_{4/2}$ units, where $R^2$ is a hydroxyl or a substituted or unsubstituted monovalent hydrocarbon radical bound directly or via an oxygen atom to the silicon atom. The monovalent hydrocarbon radical typically contains up to 20 carbon atoms $R^2{}_3SiO_{1/2}$ typically from 1 to 10 carbon atoms. Examples of suitable hydrocarbon radicals for $R^2$ include alkyl radicals such as methyl, ethyl, propyl, pentyl, octyl, undecyl and octadecyl radicals; alkenyl radicals such as vinyl, allyl, and 5-hexenyl; cycloaliphatic radicals such as cyclohexyl and cyclohexenylethyl and aryl radicals such as phenyl, tolyl, xylyl, benzyl and 2-phenylethyl. Typically at least one third, alternatively at least two thirds of the $R^2$ radicals are methyl radicals. Examples of $R^2{}_3SiO_{1/2}$ units include but are not limited to $Me_3SiO_{1/2}$, $PhMe_2SiO_{1/2}$ and $Me_2ViSiO_{1/2}$ where Me, Ph and Vi denote methyl, phenyl and vinyl respectively. The siloxane resin may contain two or more of these groups. The molar ratio of the $R^2{}_3SiO_{1/2}$ units and $SiO_{4/2}$ units in the siloxane resin is typically from 0.5:1 to 1.5:1. These ratios may be measured using $Si^{29}$nmr spectroscopy, The siloxane resins may alternatively be reactive siloxane resins of the type defined as ingredient A of WO2014/124389, incorporated herein by reference.

Adhesion Promoter

Suitable adhesion promoters may comprise alkoxysilanes of the formula $R^{14}{}_qSi(OR^{15})_{(4-q)}$, where subscript q is 1, 2, or 3, alternatively q is 3. Each $R^{14}$ is independently a monovalent organofunctional group. $R^{14}$ can be an epoxy functional group such as glycidoxypropyl or (epoxycyclohexyl)ethyl, an amino functional group such as aminoethylaminopropyl or aminopropyl, a methacryloxypropyl, a mercapto functional group such as mercaptopropyl or an unsaturated organic group. Each $R^{15}$ is independently an unsubstituted, saturated hydrocarbon group of at least 1 carbon atom. $R^{15}$ may have 1 to 4 carbon atoms, alternatively 1 to 2 carbon atoms. $R^{15}$ is exemplified by methyl, ethyl, n-propyl, and iso-propyl.

Examples of suitable adhesion promoters include glycidoxypropyltrimethoxysilane and a combination of glycidoxypropyltrimethoxysilane with an aluminium chelate or zirconium chelate. Examples of adhesion promoters for hydrosilylation curable compositions may be found in U.S. Pat. Nos. 4,087,585 and 5,194,649. The curable composition may comprise 0.01% to 1% of adhesion promoter based on the weight of the composition. Preferably, the speed of hydrolysis of the adhesion promoter should be lower than the speed of hydrolysis of the cross-linker in order to favour diffusion of the molecule towards the substrate rather than its incorporation in the product network.

Pigments, these may include, Carbon black, iron oxide, chromium pigment, cobalt pigment, copper pigment, alizarin, gamboge, cochineal red, rose madder, indigo, Indian yellow, Tyrian purple, quinacridone, magenta, phthalo green, phthalo blue, pigment red 170, diarylide yellow.

Light diffusing particles: Light diffusing particles are generally finely dispersed inorganic powders. One example is titanium dioxide, but it may as well be inorganic pigments in powder form. Other example is fumed silica. In the case of transparent applications these may only be utilised providing they have minimal effect on the transparency of the laminated assembly.

The lamination adhesive as hereinbefore described is typically stored before use in multiple, generally two parts which are mixed together shortly before or immediately before use/application, as a one part material will not exhibit more than a few hours of shelf-life. It is to be appreciated that the condensation curing process by its chemical nature generates volatile molecules that will cause bubbles in the lamination adhesive layer during the lamination, especially when confined between a gas impermeable substrate and superstrate e.g. generally the case for glass, metal or ceramic lamination. As previously indicated the lamination adhesive is stored in a multiple part manner, typically in two parts and polymer (i), cross-linker (ii) and catalyst (iii) are not stored together in the same part. The two parts of the composition may be mixed using any appropriate standard two-part mixing equipment with a dynamic or static mixer and the resulting mixture is optionally dispensed therefrom for use in the application for which it is intended. The two part composition might for example comprise any one of the following alternatives:

1) stored in two parts Part A having polymer (i) and cross-linker (ii) and Part B having polymer (i) and catalyst (iii); or
2) stored in two parts Part A having polymer (i) and catalyst (iii) and Part B having cross-linker (ii) or in cases where there are more than one polymer (i) present
3) stored in two parts, Part A having a first polymer (i) and cross-linker (ii) and Part B having second polymer (i) and catalyst (iii).

The composition may alternatively be stored in 3 or more parts should the need arise.

Given the above composition is stored in multiple parts when used for the process as hereinbefore described there would be an initial step of mixing the multiple parts of the multiple part condensation curable lamination adhesive composition as hereinbefore described. The mixed composition would then function as the flowable silicone based lamination adhesive hereinbefore described.

In this instance the viscosity of the lamination adhesive composition described above is the mixture resulting from mixing the multiple parts of this composition i.e. the initial viscosity of the mixture must be less than 100,000 mPa·s at 25° C. By initial composition viscosity we mean the compositional viscosity within a short time i.e. <10 minutes from the completion of mixing multiple parts of the composition, typically the two parts A and B together.

Once lamination has been completed the laminated assembly may undergo further processing depending on the intended end use. In the case of the laminate assembly being used in the glazing industry it may be fitted into appropriate glazing units and in the case of electronic applications the laminate assembly may e.g. undergo framing or the like so as to enclose the outer periphery of the assembly having a solar cell matrix sandwiched there between and fixedly secured to the panels by screws (if required).

The frame member into which the laminate assembly is to be inserted might be made of aluminum alloy, stainless steel or similar material having strength against shocks, wind pressure or snow deposition, weather resistance, and lightweight.

There is also provided herein a laminated assembly made using the process as hereinbefore described comprising a first and second substrate separated by a cured lamination adhesive as hereinbefore described. The first and second substrate may be made of any suitable materials, e.g. glass, wood, stone, plastics, composites, metals and ceramics or a combination, in one embodiment both the substrate and superstrate are glass panels or alternatively one of the substrate or superstrate is a glass panel and the other is made of an alternative material such as concrete material or a decorative element or a curved glass surface to the adhesive function, the lamination adhesive is used to provide impact resistance and sound insulation over a wide temperature range. Inherently, the silicone is resistant to UV light and possesses inherently better fire resistance/reaction than organic based lamination adhesives.

Laminates made using a room temperature cure lamination adhesive as hereinbefore described are intended to:
(i) assuming the substrate and superstrate are transparent, have an optically clear (haze-free), cured lamination adhesive layer between the substrate and superstrate when lamination is complete;
(ii) adhere to various substrates and
(iii) not generate bubbles during the lamination process which are retained within the lamination adhesive layer post-lamination especially if between non permeable substrates.

The assemblies formed from the current process are preferably designed for use applications requiring the manufacture of laminates where transparency is required, e.g. glass lamination or display lamination.

Lamination assemblies made by the process as hereinbefore described may be used in laminated glass for building and construction applications but can also be used for other applications e.g. in the production and/or encapsulation of displays for consumer electronics.

The assembly made using the process as hereinbefore described may be used as a vision glass component in windows and doors, one or more components in balustrade, balcony or roof applications, as a spandrel or part of a shadow box in facades, as component of an interior partition wall, as safety glass laminate, for electronic display application, as one or more components in fire resistant windows or door units, as solar control component or in sound damping barriers.

The assembly may be used in any industry including, but not limited to, automobiles, trucks, marine craft, trains, small electronics, remote area power systems, satellites, space probes, radiotelephones, water pumps, grid-tied electrical systems, batteries, battery chargers, photoelectrochemical applications, polymer solar cell applications, nanocrystal solar cell applications, lighting and dye-sensitized solar cell applications. In one embodiment, a series of modules are electrically connected and form a photovoltaic array. The photovoltaic array includes at least two modules. Photovoltaic arrays are typically used on rooftops, in rural areas connected to battery backups, and in DC pumps, signal buoys, and the like. The photovoltaic array may be planar or non-planar and typically functions as a single electricity producing unit wherein the modules are interconnected in such a way as to generate voltage. Typically the modules are electrically connected, as described above, to provide suitable voltage. The photovoltaic array may be of any size and shape and may be utilized in any industry.

The assembly made using the process as hereinbefore described may alternatively be part of a solid state light, or in solid state lighting, such as light emitting diodes (LEDs). As is known in the art, LEDs typically generate light in a forward biased state when electrons recombine with holes formed in optoelectronic semiconductors. When the electrons recombine, they release photons in a process typically described as electroluminescence. The solid state lighting can be used in any application including, but not limited to, instrument panels & switches, courtesy lighting, turn and stop signals, household appliances, DVD/stereo/audio/video devices, toys/games instrumentation, security equipment, switches, architectural lighting, signage (channel letters), retail displays, emergency lighting, neon and bulb replacement, flashlights, accent lighting full color video, monochrome message boards, in traffic, rail, and aviation applications, in mobile phones, PDAs, digital cameras, lap tops, in medical instrumentation, bar code readers, color & money sensors, encoders, optical switches, fibre optic communication, and combinations thereof.

The assembly may be a power electronic article, e.g. an electronic component with the cured lamination adhesive as hereinbefore described disposed therein. Alternatively, the cured lamination adhesive may be further defined as a semiconductor and/or dielectric film. The lamination adhesive may be sandwiched between the first and second substrate. The electronic component may be further defined as a chip, such as a silicon chip or a silicon carbide chip, one or more wires, one or more sensors, one or more electrodes, and the like. The electronic article is not particularly limited and may be, for the sake of example, defined as an insulated gate bipolar transistor (IGBT), a rectifier such as a Schottky diode, a PiN diode, a merged PiN/Schottky (MPS) rectifier and Junction barrier diode, a bipolar junction transistors (BJTs), a thyristor, a metal oxide field effect transistor (MOSFET), a high electron mobility transistor (HEMT), a static induction transistors (SIT), a power transistor, and the like. Alternatively the electronic article can be a power module, e.g. one of more of the aforementioned devices for power converters, inverters, boosters, traction controls, industrial motor controls, power distribution and transportation systems. The laminate assembly as hereinbefore described may be further defined as including one or more of the aforementioned devices.

EXAMPLES

All viscosity measurements were made using a Brookfield cone plate viscometer RV DIII with the most appropriate cone plate at 25° C. unless otherwise indicated.

The compositions used in the following examples were made by mixing part A and part B together in a speedmixer. The part A and Part B were introduced into a speedmixer and were then mixed for four periods of 30 seconds at a speed of 2000 revolutions per minute (rpm). Dimethyl OH terminated polydimethylsiloxane (viscosity ca 50,000 mPa·s) exhibits a typical average molecular weight in number of 63,000 g/mol. Trimethoxysilyl terminated polydimethylsiloxane (viscosity ca 56,000 mPa·s) exhibits a typical average molecular weight in number of 62,000 g/mol. OH terminated polydimethylsiloxane (viscosity ca 2,000 mPa·s) exhibits a typical average molecular weight in number of 22,000 g/mol. Dimethyl OH terminated polydimethylsiloxane (viscosity ca 13,500 mPa·s) exhibits a typical average molecular weight in number of 43,000 g/mol. Trimethoxysilyl terminated polydimethylsiloxane (viscosity ca 2,000 mPa·s) exhibits a typical average molecular weight in number of 22,000 g/mol.

Formulation A

The flowable silicone based room temperature cure adhesive was prepared by mixing two component together the base (Part A) was added at a ratio in weight of 3:1 over the curing agent (Part B). The base is composed of a 50,000 mPa·s silanol terminated polydimethyl siloxane. The curing agent is composed of 100 weight parts of a 56,000 mPa·s trimethoxysilyl terminated polydimethylsiloxane and 0.2 weight parts of tetra n-butyl titanate. Part A and Part B were introduced into a speedmixer and were then mixed for four periods of 30 seconds at a speed of 2000 revolutions per minute (rpm).

Process Description

200×200×4 mm$^3$ laminated glass panes were assembled using two float glass panes as the first and second substrates. The dam is prepared using a silicone hot melt (Dow Corning® Instantglaze III Window Assembly Adhesive) deposited at the periphery of the first pane. The bead thickness is about 2 mm thick. The interior of the dam was filled with flowable silicone based room temperature cure adhesive in the center of the pane. The flowable silicone based room temperature cure adhesive flows gently to form a disc.

After application both panes are put on top of each other thereby sandwiching the adhesive between them to form a pre-cured assembly and the panes are put in a VAC® Company vacuum apparatus (HVV90500) and vacuum is pulled out for the defined time (see table) using a vacuum pump. Once the time is reached, the pressurizing plate is utilised to apply pressure to the pre-cured assembly with a pressure of 80,000 Pa for the defined time. The pressure is subsequently released whilst the vacuum is maintained for a given time after which pressure is re-applied for a given time. At the end, the vacuum is released to atmospheric pressure and the pane is allowed to complete the cure process at room temperature.

Examples with Formulation A

| | Example 1 (3 units) | Example 2 (3 units) | Example 3 (1 unit) | Example 4 (1 unit) | Comp. example 1 (1 unit) | Comp. example 2 (3 units) |
|---|---|---|---|---|---|---|
| Formulation | A | A | A | A | A | A |
| Dimensions | 200 × 200 × 6.1.6 | 200 × 200 × 6.1.6 | 200 × 200 × 6.1.6 | 200 × 200 × 6.1.6 | 200 × 200 × 6.1.6 | 200 × 200 × 6.1.6 |
| Shape of flowable material | Strips two faces | Center disk | | Center disk | Center disk | Center disk |
| Time vacuum (s) | 30 | 30 | 30 | 30 | 30 | 30 |
| Time compression + vacuum (s) | 60 | 60 | 60 | 300 | 60 | 60 |
| Time vacuum (s) | 30 | 30 | 30 | 30 | 30 | 150 |
| Time compression + vacuum (s) | 120 | 120 | 60 | 60 | 0 | 0 |
| Leaks | no | no | no | no | no | no |
| Appearance after 24 h | No bubble | No bubble | No bubble | No bubble | Voids at 4 corners | Voids at 4 corners |

| | Comp. example 3 (1 unit) | Comp. example 4 (1 unit) | Comp. example 5 (1 unit) | Comp. example 6 (1 unit) | Comp. example 7 (2 units) | Comp. example 8 (1 unit) | Comp. example 9 (3 units) | Comp. example 10 (1 unit) |
|---|---|---|---|---|---|---|---|---|
| Formulation | A | A | A | A | A | A | A | A |
| Dimensions | 200 × 200 × 6.1.6 | 200 × 200 × 6.1.6 | 200 × 200 × 6.1.6 | 200 × 200 × 6.1.6 | 200 × 200 × 6.1.6 | 200 × 200 × 6.1.6 | 200 × 200 × 6.1.6 | 200 × 200 × 6.1.6 |
| Shape of flowable material | Center disk | Center disk | Center disk | Center disk | Center disk | Strips two faces | Center disk | Center disk |
| Time vacuum (s) | 300 | 0 | 0 | 600 | 420 | 420 | 300 | 120 |
| Time compression + vacuum (s) | 60 | 60 | 60 no vacuum | 120 | 60 | 60 | 120 | 180 |
| Time vacuum (s) | 30 | 30 | 30 | 0 | 0 | 0 | 0 | 0 |
| Time compression + vacuum (s) | 120 | 120 | 120 | 0 | 0 | 0 | 0 | 0 |
| Leaks | no | yes | yes | Yes | yes | no | yes | no |
| Appearance after 24 h | Voids at 2 corners | Bubbles | Bubbles | Bubbles | Voids at 4 corners | Bubbles | Voids at 4 corners | Voids at 4 corners |

Examples with Formulation A

Examples and Comparative (Comp.) examples are showing that a one compression step process is not leading to a void free and to a leak free assembly. The first compression is useful to prevent leaks in the barrier occurring later on in the process. The vacuum stage in between the two compression steps is useful to drive the product from the center to the edges. A one step process might be successful by chance but will not provide a consistent quality in the units produced. FIG. 1a attached hereto depicts a laminate made by the process as hereinbefore described.

Figure 2:
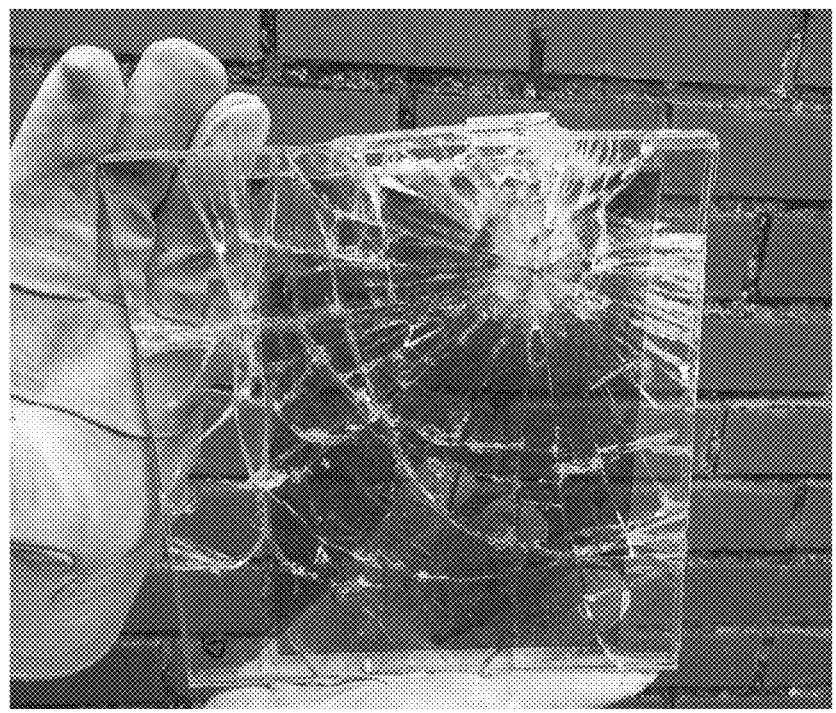

One of the resulting units was tested for impact with a 5 kg mass falling from 3 meters. No glass parts were ejected from the impact and after the impact, the glass parts were still holding together (FIG. 2), which emphasize the good adhesion of the lamination product with all parts of the laminate.

A laminated glass unit containing inserts such as plastics fabrics were made successfully as well.

Figure 1B:
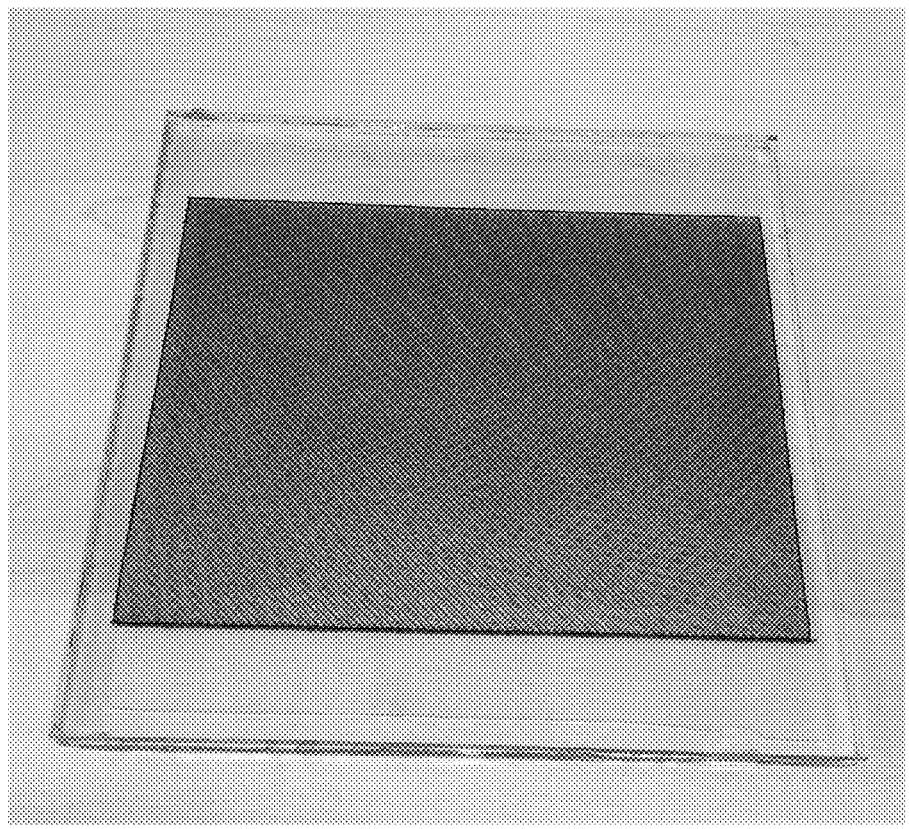

Laminated glass unit containing inserts such as plastics fabrics SEFAR® Architecture Vision CU 140/70 and SEFAR® Architecture Vision CU 260/25 were made successfully as depicted in FIG. 1b.

What is claimed is:

1. A process for making a laminate assembly comprising a cured lamination adhesive sandwiched between two substrates, said process comprising the steps of:
   (i) providing a dam of sealant around a periphery of a first substrate;
   (ii) introducing a flowable silicone based lamination adhesive onto the first substrate having the dam of sealant around the periphery thereof;
   (iii) placing a second substrate on top of the first substrate to form a pre-cured assembly, trapping the flowable silicone based lamination adhesive between the first and second substrates;
   (iv) applying a vacuum to the pre-cured assembly of step (iii);
   (v) pressing the pre-cured assembly of step (iv) at a pre-determined pressure while maintaining the vacuum;
   (vi) releasing the pre-determined pressure of step (v) while maintaining the vacuum for a period sufficient to ensure that there is provided a continuous layer of flowable silicone based lamination adhesive between the first and second substrates as defined by the peripheral dam of sealant; and
   (vii) repeating step (v) and then release the pressure and vacuum and cure the pre-cured assembly;
   wherein the flowable silicone based lamination adhesive is made by mixing a multiple part condensation curable lamination adhesive composition, the composition comprising:
   (i) at least one condensation curable silyl terminated polymer having at least one, optionally at least 2 hydrolysable and/or hydroxyl functional group(s) per molecule;
   (ii) a cross-linker selected from the group consisting of silanes having at least 2 hydrolysable groups, optionally at least 3 hydrolysable groups, per molecule group; and/or
   silyl functional molecules having at least 2 silyl groups, each silyl group containing at least one hydrolysable group; and
   (iii) a condensation catalyst selected from the group consisting of titanates and zirconates;
   wherein polymer (i) is not stored in the same part as cross-linker (ii) and catalyst (iii);
   wherein condensation catalyst (iii) is present in a molar amount which is at least 50% of the moisture present cumulatively in the parts of the composition;
   wherein the molar ratio of silicon bonded hydroxyl groups in polymer (i) to hydrolysable groups in cross-linker (ii) is above 0.5; and
   wherein the molar ratio of the silicon bonded hydroxyl groups in polymer (i) to condensation catalyst (iii) M-OR functions is greater than 10, where M is titanium or zirconium and R is an aliphatic hydrocarbon group.

2. The process in accordance with claim 1, wherein the flowable silicone based lamination adhesive in the pre-cured assembly is allowed to cure at room temperature or at a temperature above 60° C. to cure the silicone composition or by a UV exposure treatment to cure the silicone composition.

3. The process in accordance with claim 2, wherein the cure at a temperature above 60° C. takes place in a continuous furnace.

4. The process in accordance with claim 1, wherein an edge region of the laminate assembly is subsequently cut to remove any optical transition near the edge.

5. The process in accordance with claim 1, wherein the dam of sealant is made from a polyisobutylene (PIB) rubber seal, silicone hot melt material or optically clear silicone sealant.

6. The process in accordance with claim 1, wherein one or more objects are attached to the first or second substrate prior to step (iii) so that the object(s) is/are effectively encapsulated within the cured lamination adhesive layer in the laminated assembly.

7. The process in accordance with claim 6, wherein the objects are selected from decorations, electronics, photovoltaic cells or wires and/or other connectors.

8. The process in accordance with claim 1, wherein the sealant forming the dam is retained as an external protective seal around the outside of the laminate assembly.

9. The process in accordance with claim 1, wherein step (iv) of the process has a duration of from 15 seconds to 1.5 minutes.

10. The process in accordance with claim 1, wherein the time period for step (v) will be a period of from 45 seconds to 3 minutes.

11. The process in accordance with claim 1, wherein the time period for step (vi) is similar to that of step (iv) and likewise the time period for step (vii) is similar to that of step (v).

12. The process in accordance with claim 1, wherein the pressure applied in both steps (vi) and (vi) is in the range of 10,000 Pa to 400,000 Pa.

13. The process in accordance with claim 1, wherein the substrates are made from glass, wood, stones, plastics, composites, metals, or ceramics.

14. The process in accordance with claim 13, wherein at least one substrate is made of glass.

15. The process in accordance with claim 1, wherein the flowable silicone based lamination adhesive consists of components (i), (ii) and (iii) and one or more additives selected from the group consisting of pigments, dyes, adhesion promoters, light diffusing particles, siloxane resins and/or particles with fire resistant properties.

16. The process in accordance with claim 1, wherein the multiple part condensation curable lamination adhesive composition further comprises pigments, dyes, light diffusing particles and/or fire resistance properties.

17. The process in accordance with claim 1, wherein the molar ratio of silicon bonded hydroxyl groups in polymer (i) to hydrolysable groups from cross-linker (ii) is >0.15 for polymers having a viscosity ≤30,000 mPa·s at 25° C. and >0.5 for polymers having a viscosity >30,000 mPa·s at 25° C.

18. A laminated assembly obtained by the process in accordance with claim 1.

19. The laminated assembly in accordance with claim 18, wherein the assembly comprises two glass substrates and wherein the assembly is cold bended to create a curved glass product.

\* \* \* \* \*